Nov. 30, 1926.
S. H. SEARLE
1,608,676
COMPUTING CHEESE CUTTER
Filed Sept. 27, 1923   2 Sheets-Sheet 1
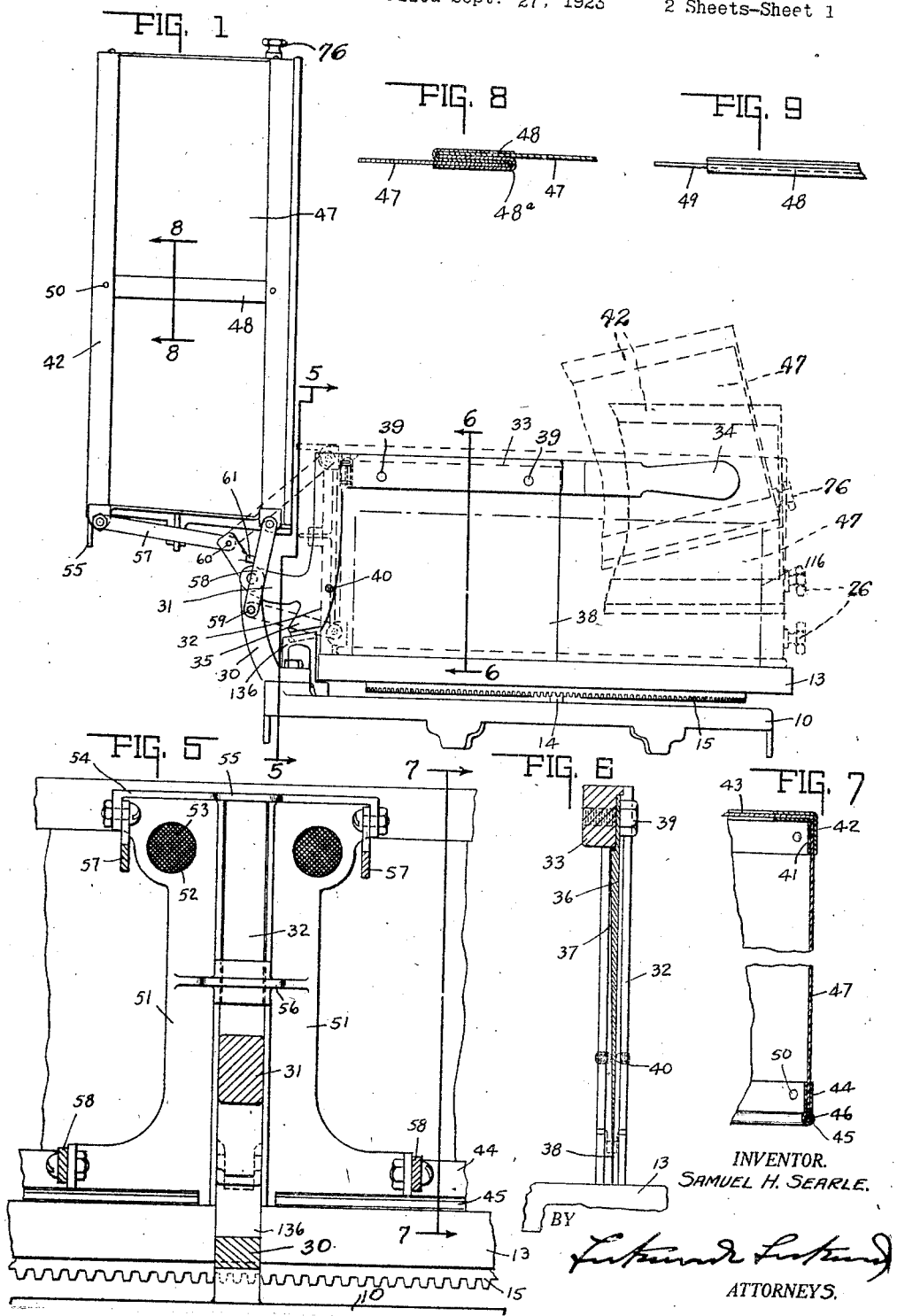
INVENTOR.
SAMUEL H. SEARLE.
BY
ATTORNEYS.

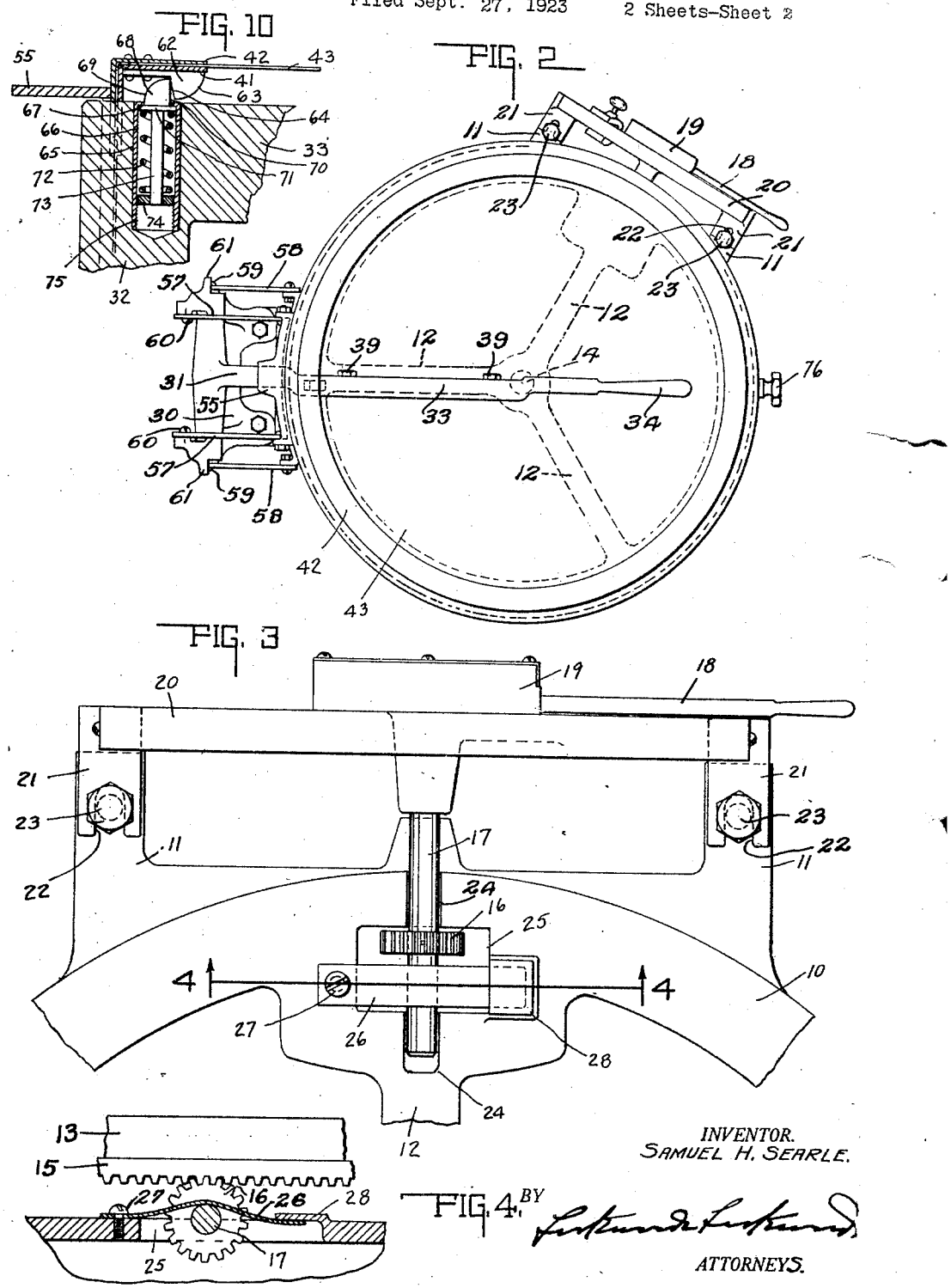

Patented Nov. 30, 1926.

1,608,676

UNITED STATES PATENT OFFICE.

SAMUEL H. SEARLE, OF ANDERSON, INDIANA, ASSIGNOR TO COMPUTING CHEESE CUTTER COMPANY, OF ANDERSON, INDIANA, A CORPORATION.

COMPUTING CHEESE CUTTER.

Application filed September 27, 1923. Serial No. 665,184.

This invention relates to cheese cutters in general and those of the computing type in particular. The chief object of the invention is to improve the cheese cutters in several particulars.

The object of the invention is accomplished by the following features. A movably supported cover which may be elevated so as to expose the cheese for cutting purposes.

Another feature is the particular construction of the cover mounting whereby movement of the cover is restrained to a substantially vertical lift and excessive uncovering movement is prevented.

Another feature of the invention consists in the means for yieldingly supporting the cover near the end of its covering movement and releasing the same when in final covering position.

Further features of the invention consist in the particular construction of the cover.

Another feature of the invention consists in the simplified mounting of the actuating mechanism for rotating the cheese board.

The full nature of this invention will be understood from the accompanying drawings and the following description and claims.

In the drawings Fig. 1 is a side elevational view of a cheese cutter with a cheese shown dotted and the cover in the non-covering position by full lines and in the covering position by dotted lines, and in an intermediate position by dotted lines. Fig. 2 is a top plan view of the cheese cutter with the cover in the covering position. Fig. 3 is an enlarged top plan view of the feeding mechanism. Fig. 4 is a transverse sectional view taken on the line 4—4 of Fig. 3 and in the direction of the arrows. Fig. 5 is an enlarged rear view of the knife support, the knife and the cover, and is taken in the plane of line 5—5 in Fig. 1 and in the direction of the arrows. Fig. 6 is a sectional view taken on the line 6—6 of Fig. 1. Fig. 7 is a sectional view taken on the line 7—7 of Fig. 5 and in the direction of the arrows. Fig. 8 is a sectional view taken on the line 8—8 of Fig. 1 and in the direction of the arrows. Fig. 9 is an end view of the cover construction shown in Figs. 1 and 8. Fig. 10 is an enlarged sectional view of the shock absorber for the cover.

In the drawings 10 indicates a suitable base which, as shown in Figs. 2 and 3, is provided with a pair of parallel projecting portions 11. The base is also provided with the spider-forming arms 12 a portion of it being shown in Fig. 3. The spider-forming arms 12 it is to be understood pivotally support a cheese supporting board or plate 13 which has a central pivot 14 and an annular rack 15 upon its under face. The board 13 is adapted to support a cylindrical cheese 116.

Adapted to engage with the rack 15 is a gear 16 carried by a shaft 17, which shaft is rotated with a step-by-step movement through the handle 18 by suitable intermediate equipment old and well known in the art which is enclosed within the housing 19 see Figs. 2 and 3. The housing 19 is supported by the shaft 17. Bracket 20 has a pair of inwardly extending projections 21, substantially parallel with each other and slotted as at 22. The projections 11 and the projections 21 cooperate with each other and are provided with a pin and slot connection formed by the bolt and nut means indicated generally by the numeral 23. The base 10 is provided with an opening 25 upon opposite sides of which are the aligned grooves 24. In said opening 25 is positioned the gear 16 upon the shaft 17 which is seated in the semi-circular grooves 24. For alignment purposes, therefore, the pin and slot connection 23 previously described is sufficient for securing the shaft 17 in the desired position, so that it will lie in the grooves 24 without straining. Heretofore it has been customary to provide closed bearings for the shaft 17, but herein a flat spring 26 at one end is suitably secured by screw 27 to the base 10 and the other end of said spring extends transversely of the grooves and preferably across the opening 25 and is seated by a spring retaining seat 28. Thus, the flat spring 26 is adapted to retain the shaft in the grooves 24 and yet permit the rotative movement of said shaft in said grooves.

Reference will now be had to Figures 1, 2 and 5. In said figures the base 10 is shown provided with an upstanding bracket 30, and said bracket 30 is preferably detachably associated with the base 10. The bracket 30 pivotally supports a knife support having the projecting portion 31, a back 32 and a top 33, which terminates in a handle 34. The back 32 is extended at 35 and is adapted to engage a stop member 136 also detachably supported by the base or by the bracket 30, as desired. The top 33 detachably supports in adjusted position a knife 36 having the inclined face 37 which, adjacent its forward and bottom edge, is beveled as at 38. The cutter plate or knife is detachably supported by said top or handle portion by the bolts 39, and herein the headless set screws 40 cooperate with the back portion 32 of the knife support to position the knife plate in substantially vertical relation with respect to the horizontally positioned table or plate 13. The stop member 136 prevents the knife 36 from cutting the plate 13 to any serious degree.

The cover construction is shown in Figs. 1, 2 and 5, and details thereof are shown in Figs. 7 to 10 inclusive. In said figures the cover construction is shown substantially cylindrical in form and is adapted to rest upon the plate 13, as shown by the dotted lines in Fig. 1. Herein the cover is shown comprised of a pair of angular rim members 41 and 42 which form the top edge of the cover. A transparent circular sheet, such as 43, is secured between the flanged rims and forms the top of the cover. The lower rim of the cover is formed by a U-shaped strip 44 which is beaded at 45 to receive a reenforcing wire 46. Thus the flange rims 41 and 42 and the U-shaped bottom rim 44 provide upper and lower grooves adapted to receive the transparent arcuate side forming members 47. The side forming members 47 are retained in position and the upper and lower rims are secured together in spaced relation by a laterally spaced construction indicated generally by the numeral 48 in Fig. 1 and shown clearly in Figs. 8 and 9. This lateral construction 48 is an S-shaped member 48$^a$ (see Fig. 8) forming a pair of oppositely directed grooves to receive and retain transparent side members 47 and prevent lateral movement thereof. Each transverse member 48$^a$ is provided at its opposite ends with a mid-portion extension 49, see Fig. 9. The upper mid-portion extension is receivable by the groove in the flanged rims 41 and 42, and the lower mid-portion extension 49 is receivable by the groove formed in the U-shaped bottom rim 44, see Fig. 7, and said rims and extensions 49 and therefore member 48, are secured by rivets 50 or the like, see Figs. 1 and 7.

As shown clearly by the dotted lines in Fig. 1, the cover preferably should have an initial substantially vertical lift so as to clear the cheese 116 supported on the table 13, and this initial vertical movement of the tiltable cover is secured by means of a link support associated with the rear of the cover. The dotted lines in Fig. 1 indicate a tilting position subsequent to the vertical movement. A pair of connected bracket members, substantially similar, but complementary, are provided, and these are in spaced relation with each other. Herein said members are indicated generally by the numeral 51 and in the upper corners thereof there is provided a suitable ventilating opening 52 closed by a screen 53. The members 51 are connected together by a bridge 54 and this bridge is provided with a projection 55 extending rearwardly and medianly thereof. Said projection 55 is adapted to rest upon the rear end of the cutter knife support 32 and 33 to form a complete closure. The resultant construction of the side members 51 and bridge construction 54 is such that a groove is provided adapted to receive the cutter supporting members 31 and 32. The members 51 are connected by the bracket portion 56. It will be noted from Fig. 5 that the stop member 136 forms with said members and the member 32, a complete closure. Pivotally supported at the top of the members 51 and at each side of the resultant construction is a pair of links 57, while at the lower edge there is provided a pair of links 58. The lower links 58 are pivotally supported at 59 beneath the pivotal support of the extension 31 of the cutter knife. The links 57 are pivotally supported at 60 upon an upward extension of the pivotal support of the knife. A stop 61 limits the movement of the lower members 58 in an upward direction and, therefore, limits the uncovering movement of the cover upon its support. It will be noted, see Fig. 5, that the links 57 and 58 are not positioned in the same planes. The upper links 57 will pass between the lower links 58 if a crossed linkage is substituted, that is, pivot 60 be positioned below pivot 59.

Reference will now be had to Figs. 1, 2 and 10 and in said figures a shock absorber construction is illustrated. Herein but one form of shock absorber construction is illustrated and the same is shown associating the cover and the knife support, but other equivalent means may be substituted therefor. Herein the cover is shown supporting a cam member 62 having a cam face 63 and a front face 64. The cutter support 32 is shown recessed at 65 to receive a spring housing member 66 having a flanged end 67. A tooth 68 having the cam face 69 and the front face 70 is slidably supported in said portion 67 and a head 71 within said spring retainer forms a seat for one end of a coil spring 72 positioned therein. A stem 73 is carried by the tooth 68 and is slidably supported by a retaining member 74 having a threaded engagement with the threaded inner end 75 of the spring retainer. Thus, when the cover is elevated by engagement with the knob or finger piece 76 upon said cover, the tooth 62 rides upwardly without interference upon the tooth 68, but upon return movement the tooth 62 engages the tooth 68 and compresses the spring 72 to cushion the shock of the return movement of said cover. When the cover has substantially reached its final position, the tooth 62 passes over tooth 68 so that the substantially parallel faces of the teeth permit longitudinal movement therebetween. Any suitable means may be provided for retaining the tooth 62 in position to secure the foregoing movement.

The invention claimed is:

1. In a cheese cutter the combination of a base, a tiltable cover therefor, and means tiltably supporting said cover upon said base at one side to provide said cover with an initial substantially vertical movement when tilted.

2. In a cheese cutter the combination of a base, a tiltable cover therefor, means tiltably supporting said cover upon said base at one side to provide said cover with an initial substantially vertical movement when tilted, and means for limiting the uncovering tilting movement.

3. In a cheese cutter the combination of a base, a tiltable cover therefor, means tiltably supporting said cover upon said base at one side to provide said cover with an initial substantially vertical movement when tilted, and means for cushioning the covering movement.

4. In a cheese cutter the combination of a base, a tiltable cover therefor, means tiltably supporting said cover upon said base at one side to provide said cover with an initial substantially vertical movement when tilted, means for limiting the uncovering tilting movement, and means for cushioning the covering movement.

In witness whereof, I have hereunto affixed my signature.

SAMUEL H. SEARLE.